United States Patent [19]

Hazenbroek

[11] Patent Number: 5,015,213
[45] Date of Patent: May 14, 1991

[54] ON-LINE CUT-UP SYSTEM WITH JOINT OPENER

[76] Inventor: Jacobus E. Hazenbroek, Burg de Zeeuwstraat 52, Numansdorp, Netherlands

[21] Appl. No.: 571,780

[22] Filed: Aug. 24, 1990

Related U.S. Application Data

[63] Continuation-in-part of Ser. No. 472,719, Jan. 30, 1990.

[51] Int. Cl.$^5$ ............................................. A22C 21/00
[52] U.S. Cl. ................................. 452/149; 452/151; 452/155; 452/167
[58] Field of Search ............... 452/167, 149, 151, 155, 452/163, 170

[56] References Cited

U.S. PATENT DOCUMENTS

| | | | |
|---|---|---|---|
| 4,468,838 | 9/1984 | Sjöström et al. | 452/149 |
| 4,558,489 | 12/1985 | Van Mil | 452/149 |
| 4,639,973 | 2/1987 | Van Der Eerden | 452/167 |
| 4,815,168 | 3/1989 | Van Der Nieuwecaar et al. | 452/149 |
| 4,896,399 | 1/1990 | Hazenbrock | 17/11 |
| 4,939,813 | 7/1990 | Hazenbruek | 17/11 |
| 4,951,353 | 8/1990 | Tieleman | 17/11 |

Primary Examiner—Willis Little
Attorney, Agent, or Firm—Thomas, Kerr & Kayden

[57] ABSTRACT

The present invention comprises a method and apparatus for automatically separating the breast (15), back (17) and saddle (21) of poultry carcasses (10) while the carcasses are moving along a poultry processing line. The carcasses are initially engaged by a disk cutter (26) which cuts along the visceral cavity between the breast and thighs of the carcass to enlarge the opening of the visceral cavity. The carcasses are carried into a first processing station (29) wherein the breast and upper back are separated from the legs, thighs and lower back of the carcass, and the breast is split and the backbone cut away from the upper back. After being separated from the breast and upper back of the carcass, the legs, thighs and lower back are carried into a second processing station (40) where the thighs are engaged by a pair of joint opening guide rods (72 and 73) which press the thighs away from the back to open the connecting joints between the thighs and lower back. A pair of cutting blades (69) separate the lower back from the legs and thighs of the carcass.

17 Claims, 2 Drawing Sheets

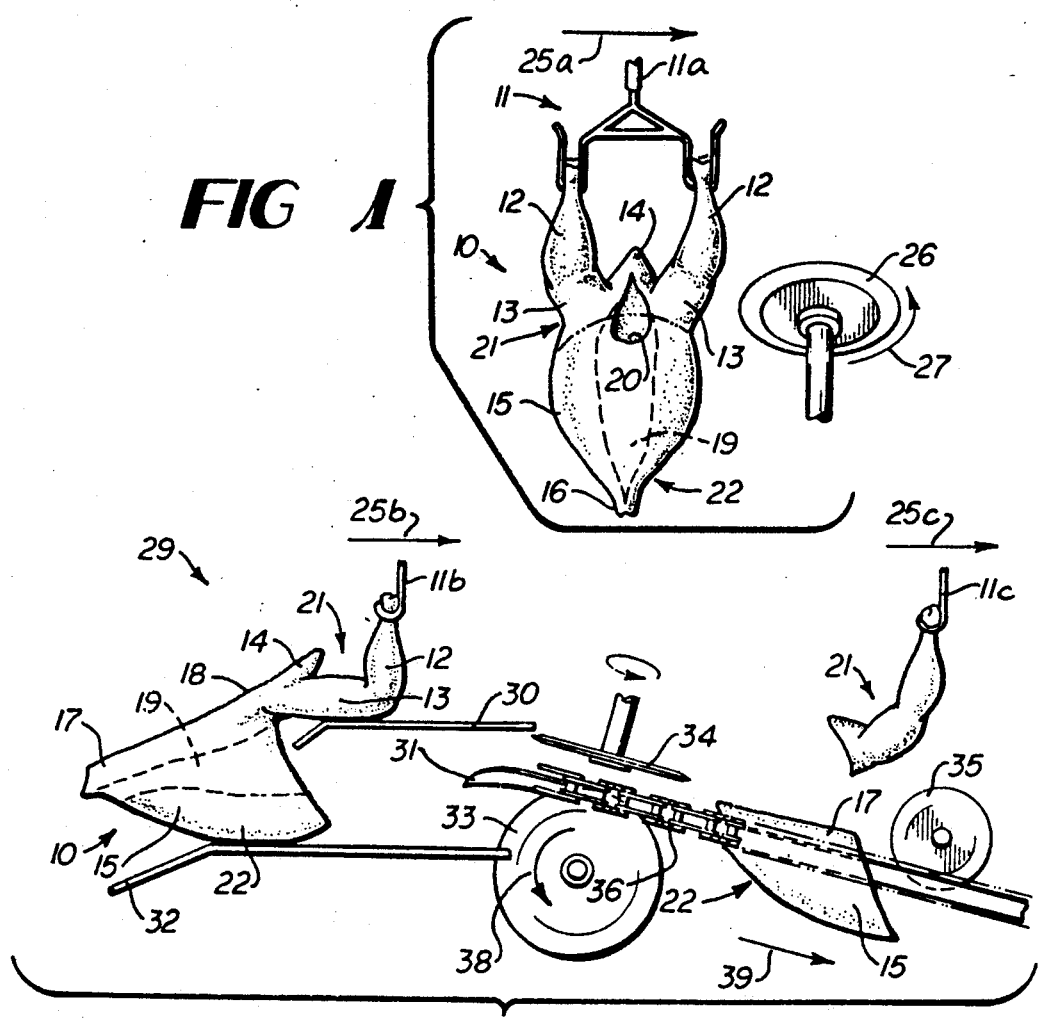
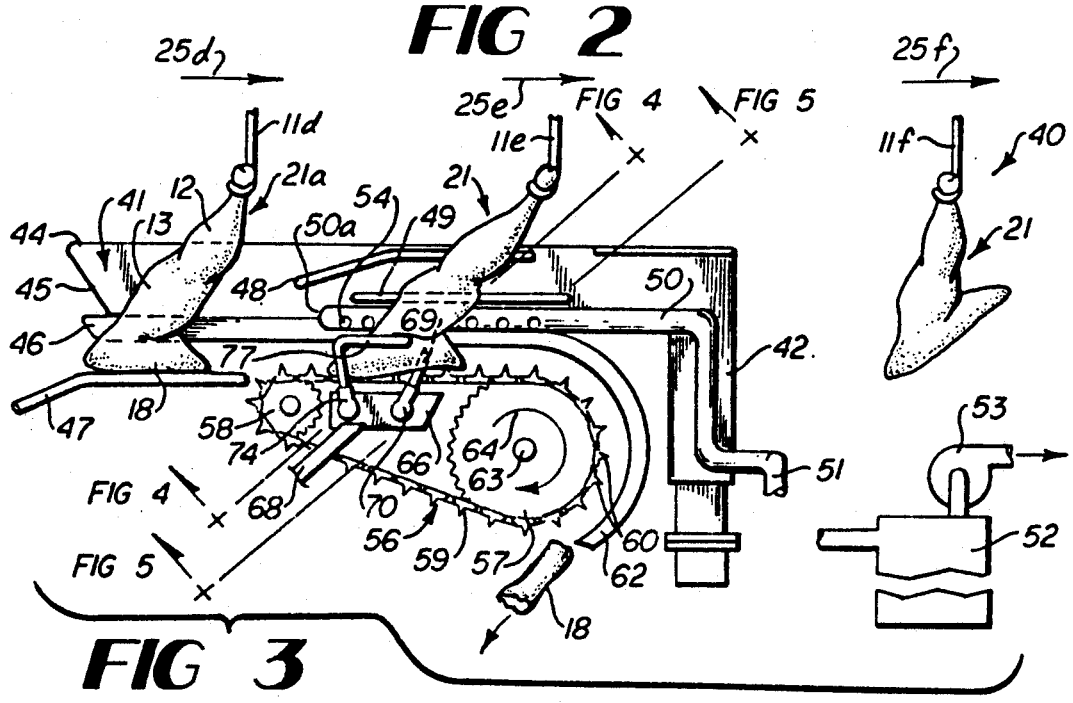

ON-LINE CUT-UP SYSTEM WITH JOINT OPENER

CROSS REFERENCE TO RELATED APPLICATION

This is a continuation-in-part of U.S. Pat. application Ser. No. 472,719, filed 1/30/90.

FIELD OF THE INVENTION

This invention relates in general to a method and apparatus for automatically cutting apart previously eviscerated poultry carcasses as the carcasses are moved in series along a suspended conveyor system, with each carcass being suspended by its legs as it moves along the processing path. More particularly, the invention relates to a method and apparatus for dividing the breasts, cutting the breast away from the saddle, cutting the back out of both the breast and the saddle, and opening the joint between the thigh bone and backbone of the saddle.

BACKGROUND OF THE INVENTION

When chickens, turkeys and other types of poultry are to be processed through a poultry processing plant for defeathering, evisceration, cut up and for packaging and delivery to the retail grocery store, etc. it is highly desirable to perform as many of the processing steps with automated machinery and with a minimum of manual labor, so as to minimize the expense of the process and to uniformly cut apart the birds.

In recent years, birds have been suspended by their legs by a suspended ("overhead") conveying system and many of the processing steps have been performed on the birds as they move in series on the conveying system. For example, the birds can be defeathered, decapitated, opened and eviscerated while being advanced progressively through a poultry processing plant on an overhead conveying system. It is further desired that the birds be segmented while continuing their travel on the overhead conveying system, so as to avoid the manual handling of the birds when performing the cutting functions. However, it is still common practice to remove the poultry carcasses from the overhead conveying system in order to cut apart the birds.

Recently, there have been a few efforts to form preliminary cuts in poultry carcasses while the carcasses still remain suspended by their legs on an overhead conveying system. For example, U.S. Pat. No. 4,574,429 discloses a poultry halving method and apparatus whereby the birds remain suspended by their legs on an overhead conveyor system as the birds are cut between the forward breast portion of the bird and the rear or saddle portion of the bird. However, the forward breast portion of the bird is permitted to fall uncontrolled to a receptacle or conveyor for further manual handling.

Additionally, when poultry products are cooked, it is desirable to cook the products rapidly so that the heat energy is conserved. Further, it is highly desirable to cook the products uniformly so that the thinner portions of the product are not overcooked and the thicker or more massive portions of the products are not overcooked. When the back of a poultry carcass is not separated from the thighs and legs of the carcass prior to being cooked, it is more difficult to uniformly cook the product. This is caused by the greater thickness of the product in the area of the joint between the thigh bone and back than, for example, the leg of the product. As a consequence, the cooking process must be performed at a lower temperature and at a slower rate in order to have the heat properly penetrate the massive portion of the thigh/back and uniformly cook this part of the bird.

In order to increase the rate of looking an undivided saddle or of cooking divided saddles where the thigh remains attached to the back portion of a bird, it is possible to separate or "open" the joint between the thigh and the back while the meat and tissue around the joint is stretched but not separated so as to reduce the density of the meat/bone in this area of the bird carcass so that the product will cook more rapidly. This opening or separation of the joint elements typically requires an additional step in the of handling the bird.

Therefore, it can be seen that it is desirable to provide an improved method and apparatus which performs the functions of cutting apart the previously eviscerated poultry carcasses as the carcasses are moved in series along an overhead conveyor system, and as the carcasses are cut apart, the pieces removed from the carcasses are received by and are automatically processed by equipment that continues to control the divided pieces so as to avoid further manual handling of the carcass parts.

SUMMARY OF THE INVENTION

Briefly described, the present invention comprises a method and apparatus for automatically subdividing parts of previously eviscerated poultry carcasses as the carcasses are moved in spaced series along an overhead conveyor system, with the carcasses hanging by their legs from the conveyor system. As may be necessary, a cut is made between the breast and the saddle of each carcass through the webs of tissue extending at the sides of each bird between the breast and saddle so as to fully open the visceral cavity of each bird. Each bird is then turned and its visceral cavity is mounted on an inner guide rail which guides the upper backbone of the carcass through the cutting steps necessary to divide the breasts, divide the upper carcass from the saddle and to cut along the backbone of the upper carcass. In the meantime, the saddle, which includes the legs, thighs, and lower back of each bird, is carried to a second processing stage where the joints between the thighs and the back are opened, the residual kidneys and fat and the like are removed from the surfaces of the saddle facing the visceral cavity, and the lower back is cut so as to divide the saddle in half.

Thus, it is an object of this invention to provide an improved method and apparatus for cutting apart poultry carcasses as the carcasses are moved in series along an overhead conveying system in a poultry processing plant.

Another object of this invention is to provide a method and apparatus for opening the joint between the thighs and back of a bird as the carcass of the bird is suspended invertedly on and transported by an overhead conveyor system.

Another object of this invention is to provide a method and apparatus for automatically removing residual kidney and fat tissue from the surface of a saddle of a bird facing the visceral cavity of the bird as the saddle of the bird is transported on an overhead conveying system.

Other objects, features and advantages of the present invention will become apparent upon reading the following specification, when taken in conjunction with the accompanying drawings.

BRIEF DESCRIPTION OF THE DRAWINGS

FIG. 1 is a side elevational view of a suspended poultry carcass as it is transported by an overhead conveyor system, showing the carcass as it approaches a disk cutter that is to slice the side webs of the bird that extend between the breasts and saddle of the bird.

FIG. 2 is a side elevational view of the first processing station of the on-line cut-up system, showing how the upper carcass portion is removed from the saddle of each bird, and showing the cuts made on the upper carcass.

FIG. 3 is a side elevational view of the second processing station of the on-line cut-up system, showing the manner in which the saddle of each bird is carried through the station.

DETAILED DESCRIPTION

Figure 4:
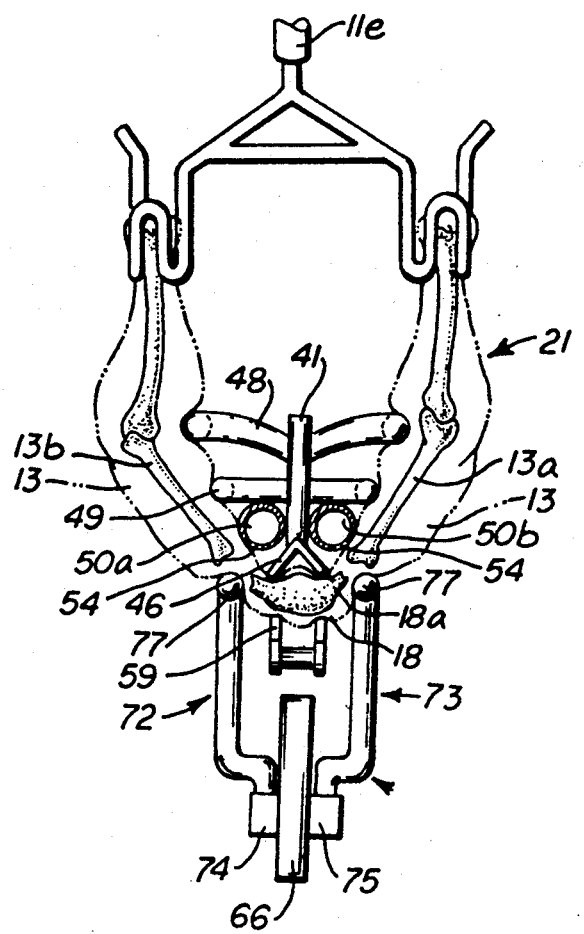
FIG. 4 is an end view of the second station of the on-line cut-up system, indicating how the system opens the joints between the thigh bones and back of the bird.

Referring now in more detail to the drawings, in which like numerals indicate like parts throughout the several views, FIGS. 1 and 2 illustrate a bird or poultry carcass 10 suspended from a shackle 11 of a conventional overhead conveyor system (not otherwise shown), with the bird 10 including legs 12, thighs 13, tail 14, breast 15, neck 16, upper back 17 and lower back 18. The legs 12, thighs 13, lower back 18 and tail 14 comprise the lower carcass or "saddle" portion 21 of the bird 10, whereas the breast 15 and upper back 17 comprise the upper carcass 22 of the bird 10. The bird 10 has been previously eviscerated and includes a visceral cavity 19, shown in broken lines, that extends from the area of the vent opening 20 to the neck 16.

The bird 10 is moved along the overhead conveyor system in the direction as indicated by arrow 25A. Positioned in the path of movement of the bird 10 is a rotary disk cutter 26. The disk cutter 26 rotates in the direction as indicated by arrow 27, and is tilted between vertical and horizontal attitudes so that the cutting action of the cutter 26 reaches downwardly behind the breast 15 and in front of the thighs 13 toward the upper and lower back 17 and 18 and cuts into the tissue of the bird 10. The incision thus created extends between the breast 15 and the saddle 21, thereby tending to further open the visceral cavity 19 of the bird 10.

When the bird 10 moves from the cutting station of FIG. 1 to the first processing station 29 of FIG. 2, the bird is rotated 90° by turning the shackle 11 as it rotates along the conveyor system. As illustrated in FIG. 2, the first processing station 29 comprises positioning plates 30, internal guide rails 31, entrance guide rods 32, breast cutter 33, horizontal cutter 34, back cutter 35, and side conveyors 36. The entrance guide rods 32 comprise a pair of guide rods 32 positioned on opposite sides of the bird 10, with the guide rods 32 being sloped upwardly in the direction of the processing path. The guide rods 32 are engaged by the keel portion of the breast 15, causing the breast 15 to tilt rearwardly and upwardly with respect to the direction of movement of the bird 10 as indicated by arrow 25B, thereby causing the visceral cavity 19 of the bird 10 to become more aligned with the internal guide rail 31.

In the meantime, the thighs 13 of the bird engage and become partially supported by the positioning plates 30, so that the visceral cavity 19 is raised to the proper elevation for moving onto the internal guide rail 31. The positioning plates 30 comprise a pair of horizontally extending plates that are arranged in side by side relationship parallel to one another, so that a slot is formed between the plates 30, with the facing edges of the slot tending to guide the back of the bird through the processing station.

As the upper carcass portion 22 of the bird 10 moves onto the internal guide rail 31, the visceral cavity 19 becomes mounted on the internal guide rail, so that the upper back 17 of the bird 10 tends to ride on the internal guide rail. In the meantime, the conveyors 36 are positioned beneath and on opposite sides of the guide rail 31, with the conveyors 36 straddling the breast cutter 33. The side conveyors 36 are continuous chain conveyors which engage the meat on the exterior of the breast 15 and move the breast 15 in timed relationship along the guide rail 31 with respect to the movement of the shackle 11B and the saddle 21 of the bird 10. Since the guide rail 31 slopes downwardly away from the path 25B, the breast 15 tends to begin a movement downwardly away from the saddle 21 of the bird 10.

As the bird 10 approaches the ends of positioning plates 30, the upper and lower back portions 17 and 18 of the bird 10 reach the horizontal cutter 34. Cutter 34 severs the back of the bird 10, so that the upper back portion 17 moves with the breast 15 along the downwardly sloped internal guide rail 31, whereas the lower back portion 18 continues to move with the saddle 21 of the bird 10.

In the meantime, the breast cutter 33 is oriented in a vertical attitude and rotates in the direction as indicated by arrow 38. The breast cutter 33 is aligned between the side conveyors 36 and is movable upwardly into close proximity with respect to internal guide rail 31, so as to cut vertically through the breast 15 of the bird 10 as the breast 15 is urged along the downwardly inclined path in the direction as indicated by arrow 39. Thus, the breast 15 is divided by the breast cutter 33 as the upper back 17 of the upper carcass rides along the internal guide rail 31.

After the breast 15 has been divided by breast cutter 33, the upper carcass is urged by the side conveyors 36 further along the internal guide rail 31 until the upper back 17 reaches back cutter 35. Back cutter 35 can comprise a single rotary disk cutting blade aligned with internal guide rail 31 or a pair of similar rotary disk cutting blades that straddle the internal guide rail 31. When a single blade is used, the upper back 17 of the bird 10 is split in half by the back cutter 35. If two such blades are used, the backbone of the bird 10 is cut away from the breast halves.

When the upper carcass 22 that includes the breast 15 and upper back 17 has passed through the processing station 29 of FIG. 2, and the first processing operations have been completed, the upper carcass 22 will have been divided in halves. Once separated, the halves of the upper carcass will fall to an awaiting container, conveyor belt or other suitable surface.

As illustrated in FIG. 3, the second processing station 40 includes a guide rail 41 extending along the path of movement 25D, 25E and 25F of the shackles 11D, 11E and 11F, with the guide rail 41 being supported at its distal end by upright adjustable stanchion assembly 42. The proximal end 44 of the guide rail 41 includes a downwardly tapered nose portion 45, and the lower edge of the guide rail 41 includes an inverted V-shaped track 46 which extends along the length of the guide rail 41. Upper and lower pairs of guide rods 48 and 49 are mounted to and extend laterally from the side surfaces of the guide rail 41, and a pair of vacuum ducts 50 are mounted on opposite surfaces of the guide rail 41. The vacuum ducts 50 extend parallel to the V-shaped track 46 and turn downwardly at stanchion 42 and communicate with a common exhaust duct 51 that leads to a collection chamber 52, with a compressor 53 arranged to draw a stream of air through the collection chamber 52 and back through the exhaust duct 51 and vacuum ducts 50.

Chain conveyor 56 is positioned beneath and parallel to guide rail 41 and includes large drive sprocket 57, smaller driven sprocket 58 and endless conveyor chain 59. Conveyor chain 59 is similar to the conveyor chain used on side conveyors 36 of first processing station 29, and includes a series of outwardly protruding teeth 60 that move along the upper flight of the conveyor chain 59 in close proximity with respect to the inverted V-shaped track 46. Arcuate guide rod 62 is mounted at its upper end portion to the lower edge of guide rail 41 and curves about the portion of the chain conveyor 56 that extends about the larger drive sprocket 57. Drive sprocket 57 is driven by a motor (not shown) about axle 63 in the direction as indicated by arrow 64.

Figure 5:
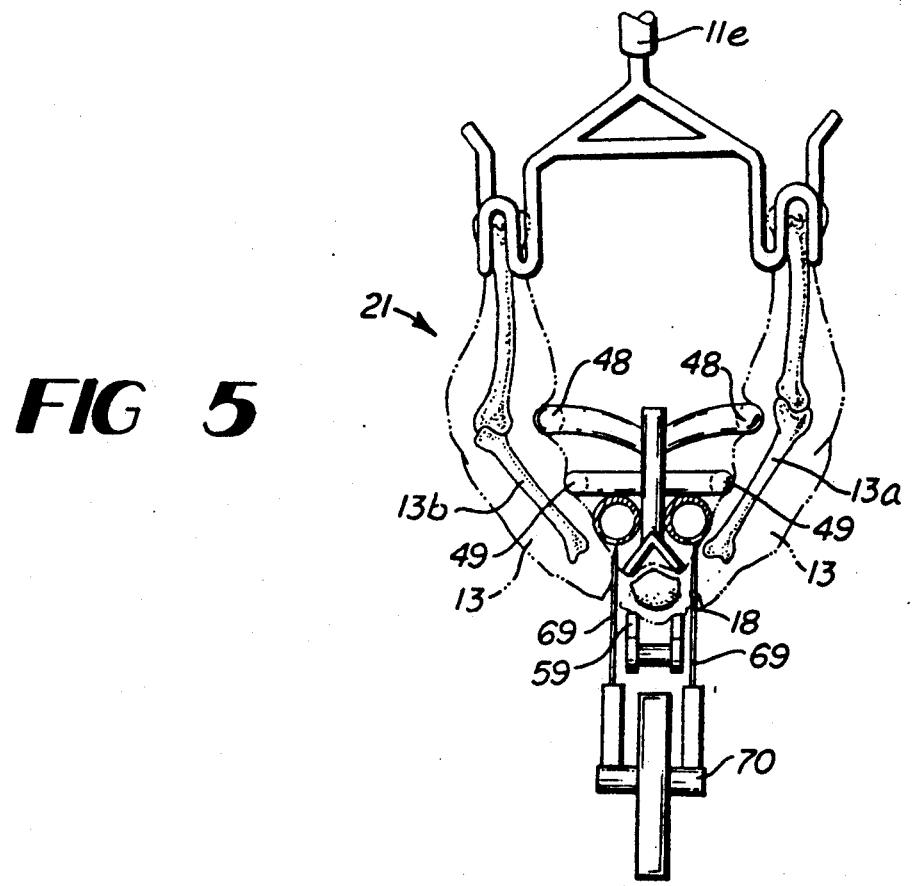
FIG. 5 is an end sectional view, similar to FIG. 4, but showing how each bird is cut along its backbone.

Support plate 66 is located inside the path of travel of chain conveyor 56 and maintained in a stationary position by a pair of support arms 68 that straddle the conveyor chain 59 and are fastened to another support (not shown). A pair of stationary cutting blades 69 are mounted to support plate 66, straddling the path of the conveyor chain 59, and extend outwardly toward the inverted V-shaped track 46 (FIG. 5). The blades 69 are each removably mounted by blade support elements 70 which are in turn attached to the support plate 66.

As illustrated in FIGS. 3 and 4, a pair of joint opening guide rods 72 and 73 are also mounted to the support plate 66. The guide rods are also adjustably supported by guide rod support elements 74 and 75. Each guide rod 72 and 73 includes an upper compression leg 77 that extends generally parallel to guide rail 41, with the exact attitude of the compression legs 77 being adjustable by adjusting the guide rod support elements 74 and 75. Likewise, inner guide rods 48 and 49 are mounted to guide rail 41 and each includes an approximately horizontal run that extends approximately parallel to guide rail 41.

OPERATION

As the overhead conveyor system functions to carry its shackles 11A-11F (FIGS. 2 and 3) through the first and second processing stations 29 and 40, the shackles 11A-11F first carry the birds 10 through the rotary disk cutter 26 (FIG. 1) which cuts through the skin tissue of the bird 10 that extends from the breast 15 to the saddle 21, so as to enlarge the access to the previously eviscerated visceral cavity 19 of each bird 10.

After the birds 10 have been cut by the rotary disk cutter 26, the shackles are rotated 90°, as illustrated by shackle 11B shown in FIG. 2, so that the breasts 15 and legs 12 face in the forward direction of movement of the bird 10. As illustrated in FIG. 2, the breast 15 of each bird 10 is engaged during its movement by entrance guide rods 32 that tend to tilt the breast 15 with respect to the saddle 21, so that the visceral cavity 19 becomes more aligned with the internal guide rail 31.

In the meantime, the thighs 13 of each bird 10 will engage the upper surface of the positioning plates 30 and become supported by the positioning plates 30. The thighs 13 slide along the upper surface of the positioning plates 30, lifting and supporting the breast 15 as the breast 15 moves toward the internal guide rail 31. Thus, the thighs 13 function as a locator so that the visceral cavity 19 of each bird 10 will be maintained at the proper elevation for alignment with the internal guide rail 31. The facing side edges of the positioning plates 30 define an open-ended slot therebetween (not shown), so that the back of each bird 10 passes between the positioning plates 30 toward horizontal cutter 34. The backbone of the bird is pulled into contact with the facing side edges of the positioning plates 30 which tend to grasp the backbone of the bird 10 at a notch or space between the vertebrae of the backbone. This engagement of the backbone by the side edges of the positioning plates 30 holds the bird 10 within the open-ended slot to prevent the bird 10 from jumping or being pulled out of the apparatus as the bird 10 is engaged by the horizontal cutter 34.

As each bird 10 approaches internal guide rail 31, the breast 15 of each bird 10 is engaged on opposite sides by the side conveyors 36, so that the breast 15 is positively urged along the length of the internal guide rail 31, with the upper back portion 17 of the upper carcass 22 of the bird 10 riding along the top surface of the guide rail 31. The breast 15 engages the vertical breast cutter 33, so that the breast 15 is divided in half along its keel. In the meantime, the back of the carcass is passed into engagement with the horizontal cutter 34, which cuts the back between the upper back 17 and the lower back 18, to separate the saddle 21 from the upper carcass 22. This frees the upper carcass 22 for continued downwardly sloped movement along the internal guide rail 31, so that the upper back 17 is passed to the back cutter 35. Back cutter 35, when in its single cutting blade configuration, splits the upper back of the upper carcass 22. When a pair of cutting blades are used, the back cutter 35 will cut on opposite sides of the backbone of the upper carcass 22, which effectively cuts the backbone 18 away from the upper carcass 22.

In the meantime, the saddle 21 of the bird 10 is freed from the upper carcass 22 and is carried by shackle 11C further along the processing path as indicated by arrow 25C. At the same time, the upper carcass 22 is moved in a downward sloped direction as indicated by arrow 39.

As illustrated in FIGS. 3, 4 and 5, the saddle 21 of each bird continues to be transported by the shackles 11D-11F along the processing path 25D-25F of the conveying system, so that the first saddle 21A is guided into a straddled relationship with respect to guide rail 41, with the lower back 18 being positioned below the guide rail 41, as directed by the tapered nose 45 of the guide rail 41 and the entrance guide rods 47. The legs 12 and thighs 13 straddle the guide rail 41, and the saddle 21 tends to trail behind the shackle 11D of the overhead conveyor system. The internal surface of the lower back 18 is urged upwardly against the inverted V-shaped track 46 that extends along the lower edge of guide rail 41 by the lifting effect of the shackles 11D and 11E as they pull the saddle 21 through the second processing station 40, and by the entrance guide rods 47 which engage the exterior surface of the lower back 18.

As the saddle 21 is moved further along guide rail 41, the chain conveyor 56 engages the lower back 18 and positively moves the saddle 21 in unison with the movement of the shackle 11E of the overhead conveyor system. The conveyor chain 59 (FIG. 4) positively urges the lower back 18 of the bird 10 into engagement with the inverted V-shaped track 46, with the protrusions of the vertebra of the backbone 18A tending to fit within the recess of the inverted V-shaped track 46, thereby positively guiding the back of the bird 10 along the lower edge of the guide rail 41.

In the meantime, the interior surface of the lower back 18 that faces the visceral cavity of the bird 10 also rides adjacent the vacuum ducts 50A and 50B, and each vacuum duct 50A and 50B includes a series of openings 54 spaced along its length and facing downwardly toward the interior surface of the lower back 18. As the lower back portion 18 of the saddle 21 of the bird 10 moves adjacent the openings 54 (FIG. 3), the flow of air into the openings 54 as induced by the compressor 53 tends to draw the fat and residual kidney tissue and other tissue away from the saddle 21 into the vacuum ducts 50A and 50B, so as to remove this loose matter from the birds 10 and transport the loose matter to the collection chamber 52.

As illustrated in FIGS. 3 and 4, when the saddle 21 reaches the joint opening guide rods 72 and 73, the upper compression legs 77 of each guide rod engages the thighs 13 adjacent the joint between the thigh bones 13A and 13B and the backbone 18A, with the direction of force applied by the upper compression legs 77 being directed generally upwardly and inwardly with respect to the thigh bones 13A and 13B, so as to dislodge or open the joint (FIG. 4). The positions of the joint opening guide rods 72 and 73 can be adjusted at their respective support elements 74 and 75 so as to exert more or less upward force and to adjust the area on the bird 10 where the forces are applied, so as to achieve this joint opening function.

Once the thigh/back joints have been opened as illustrated in FIG. 4, the saddle 21 of each bird 10 is moved further along the processing path by the chain conveyor 56 so that each saddle 21 passes through the cutting blades 69 that straddle the conveyor chain 59. The cutting blades 69 cut upwardly through the saddle 21 and through the lower back 18, straddling the vertebra of the backbone of the bird 10 which effectively cuts out the backbone of the lower back 18. The positive movement of the lower back 18 as induced by the conveyor chain 59 causes a positive cutting motion to be performed at the cutting blade 69.

The forces applied by the cutting blades 69 in conjunction with the forces applied by the joint opening guide rods 72 and 73 act to dislodge or open the joints of the thigh bones 13A and 13B and backbone 18B. Additionally, the lower guide rods 49 and the upper guide rods 48 tend to stabilize the thighs as the joint opening function occurs. These guide rods 48 and 49 tend to maintain the thigh bones 13A and 13B in the proper orientation so that the forces applied by the joint opening guide rods 72 and 73 and by the cutting blades 69 properly function to open the joints of the thighs/back and to accurately cut the back from the saddle.

After the back has been cut from the saddle (FIG. 5), the chain conveyor 56 continues to move the back, so that the back 18 travels around the arcuate path of drive sprocket 57 with the arcuate guide rod 62 assuring that the back is withdrawn from the remaining parts of the saddle 21, and the back is removed in a downward direction and discharged at the lower portion of the second processing station 40. This effectively divides the saddle 21 into halves, so that each saddle half includes a leg, a thigh, and one half of a lower back portion of a bird, as indicated in the right hand portion of FIG. 3. Thus, the saddle halves are carried to a subsequent processing station where the saddle halves can be removed from the overhead conveyor system or further cut, if appropriate.

It will be understood that the foregoing relates only to a preferred embodiment of the present invention, and that numerous changes and modifications may be made therein without departing from the spirit and scope of the invention as set forth in the following claims.

I claim:

1. A method of subdividing poultry carcasses comprising:
   moving a plurality of previously eviscerated birds suspended by their legs in spaced series on an overhead conveyor system along a processing path,
   as each of the birds moves along the processing path:
   splitting the breast of the bird,
   removing the breast and upper back from the saddle of the bird,
   cutting along the backbone of the upper back of the bird,
   opening the joints between the thighs and the lower back of the saddle of the bird, and
   cutting along the backbone of the lower back of the saddle of the bird.

2. The method of subdividing poultry carcasses as set forth in claim 1 and wherein the step of opening the joints between the thighs and lower back of the bird comprising maintaining the lower back in a predetermined processing path and pushing against the thighs adjacent the joints to exert a force to the thigh bones that induces the thigh bones to move away from the back.

3. A method of subdividing poultry carcasses as set forth in claim 1 and further including the step of drawing a zone of low pressure along the processing path at positions adjacent the portion of the saddle of the bird facing the visceral cavity to draw fat, kidney tissue and the like from the saddle.

4. The method of subdividing poultry carcasses as set forth in claim 1 and wherein the step of moving a plurality of previously eviscerated birds along a processing path comprises mounting the visceral cavity of each bird on the inner guide rail, and wherein the step of splitting the breast of the bird comprises cutting upwardly through the breast of the bird toward the inner guide rail.

5. A method of removing fat, kidneys or the like from previously eviscerated poultry carcasses comprising
   moving the saddle of each of a plurality of carcasses suspended by their legs in spaced series along a processing path, and as the saddle moves along the processing path:
   passing the suspended saddle into engagement with a guide rail,
   guiding the back of the carcass along the lower edge of the guide rail, and
   removing the fat, residual kidney tissue and the like from the saddle as the back of the carcass is guided along the lower edge of the guide rail.

6. The method of claim 5 and further comprising the steps of engaging the saddle with a chain conveyor and pulling the saddle along the guide rail in timed relationship with the movement of the shackle along the overhead conveyor system.

7. The method of claim 5 and wherein the step of removing the fat, residual kidney tissue and other tissue from the saddle comprises the steps of inducing an airflow through vacuum ducts on opposite sides of the guide rail, moving the interior surface of the saddle along the guide rail adjacent the vacuum ducts, and drawing the fat, residual kidney tissue and the like into the vacuum ducts.

8. A method of opening the thigh/back joints of poultry saddles and subdividing the saddle as the saddles are moved on an overhead conveyor line suspended by their legs in an inverted attitude along a processing path, comprising the steps of:
compressing the thighs of the carcass inwardly with a force effective to open the joints between the thighs and back of the saddle; and cutting along the back of the saddle to separate the saddle in halves.

9. The method of claim 8 and wherein the step of cutting along the back of the saddle comprises urging the back of the saddle away from the legs and thighs of the saddle to remove the back of the saddle from the legs and thighs of the saddle.

10. The method of claim 8 and wherein the step of separating the legs and thighs from the back of the saddle includes severing the tendons connecting the thighs and back.

11. Apparatus for cutting apart the breasts, backs and saddles of poultry carcasses as the carcasses are moved along an overhead conveyor line suspended by their legs in an inverted attitude comprising:
a first processing station positioned along the path of movement of the carcasses for separating the breasts and upper back from the saddles of the carcasses and segmenting the breasts; and
a second processing station positioned along the path of movement of the carcasses, behind said first processing station for removing excess fat and tissue from the saddles of the carcasses and segmenting the saddles of the carcasses.

12. The apparatus recited in claim 11 and wherein said first processing station comprises:
an internal guide rail for receiving and supporting the visceral cavity of each carcass with the upper back on top and the breast hanging below said internal guide rail;
a vertical cutting means positioned below said internal guide rail for separating the breast into halves as each carcass moves along said internal guide rail;
a horizontal cutting means positioned along said internal guide rail after said vertical cutting means for cutting the carcasses between the breast and thighs and through the backbone of the carcasses to separate the saddle from the breast and upper back of the carcasses;
a conveyor means for urging the breast and upper back of the carcasses along said internal guide rail; and
back removal means positioned above said internal guide rail for removing the backbone of the carcasses.

13. The apparatus recited in claim 11 and wherein said second processing station comprises:
an elongated guide rail positioned along the path of movement of the legs, thighs and lower back of the carcasses for receiving the saddle with the thighs straddling the elongated guide rail;
a pair of vacuum ducts mounted on opposite sides of said guide rail for removing the excess fat and tissue from the back and thighs as the back and thighs move along the elongated guide rail;
a cutting means mounted along said guide elongated rail straddling the path of movement of the lower back of the carcasses for cutting the lower back from the thighs of the carcasses; and
a pair of joint opening members mounted below said guide rail before said cutting means in a position to engage and compress the thighs of each carcass upwardly and inwardly so as to dislodge and open the connecting joint between the lower back and thighs of each carcass.

14. Apparatus for opening the joints of poultry saddles as the saddles are moved along an overhead conveyor line suspended by their legs in an inverted attitude along a processing path, comprising:
an elongated guide rail extending parallel to the overhead conveyor line for receiving the saddle in straddled relationship about the elongated guide rail and guiding the saddle along the processing path;
a removal means straddling said guide rail for removing excess fat, and kidney tissue or the like from the poultry saddles;
a cutting means mounted along said guide rail in the path of movement of the poultry saddles for cutting the lower back from the legs and thighs of each poultry saddle;
a conveyor means mounted below and parallel to said guide rail for engaging and pulling the lower back of each poultry saddle away from the legs and thighs of the poultry saddle as the poultry saddle is cut; and
a joint opening means positioned along said guide rial before said cutting means for engaging and urging the thighs of the poultry saddle away from the back of the saddle so as to dislodge and open the connecting joint between the thighs and back of the saddle prior to said cutting means engaging and cutting the back away from the legs and thighs of the poultry saddle.

15. The apparatus of claim 14 and wherein said removal means comprises a pair of vacuum ducts positioned on opposite sides of said guide rail and each having a plurality of openings along their length facing an interior surface of the lower back of the poultry saddle, and means for drawing a stream of air through said vacuum ducts to pull excess fat and tissue away from the lower back and through said openings and along said vacuum ducts for removal.

16. The apparatus of claim 14 and wherein said cutting means comprises a pair of stationary cutting blades said guide rail in alignment with the lower back of the saddle for cutting along the lower back.

17. The apparatus of claim 14 and wherein said joint opening means comprises a pair of joint opening guide rods straddling said guide rail for engaging the thighs of each poultry saddle as the saddle is pulled along said guide rail with its lower back in contact with the lower surface of said guide rail, and wherein said joint opening guide rods and presses the thighs of the poultry saddle each being positioned to apply a force upwardly and inwardly to the thighs to dislodge and open the connecting joint between the thigh bones and backbones of the poultry saddles.

* * * * *